United States Patent [19]

Pardee

[11] 4,096,079

[45] Jun. 20, 1978

[54] PROTECTIVE LUBRICATING COMPOSITIONS FOR RECORDINGS

[75] Inventor: Robert P. Pardee, Boulder, Colo.

[73] Assignee: Ball Brothers Research Corporation, Boulder, Colo.

[21] Appl. No.: 722,174

[22] Filed: Sep. 10, 1976

[51] Int. Cl.² .............................................. C10M 1/32
[52] U.S. Cl. .............................. 252/51.5 R; 252/49.9; 252/51; 252/54; 252/54.6; 252/58; 427/371; 428/64
[58] Field of Search ............... 252/51, 51.5 R, 58, 252/49.9, 54, 54.6

[56] References Cited

U.S. PATENT DOCUMENTS

| | | | |
|---|---|---|---|
| 2,411,159 | 11/1946 | Hanford | 252/58 X |
| 3,067,262 | 12/1962 | Brady | 252/58 X |
| 3,105,824 | 10/1963 | Green et al. | 252/58 X |
| 3,862,860 | 1/1975 | Pardee et al. | 252/58 X |
| 3,954,637 | 5/1976 | Pardee et al. | 252/12 |
| 3,998,989 | 12/1976 | Pardee et al. | 252/58 X |

*Primary Examiner*—Delbert E. Gantz
*Assistant Examiner*—Andrew H. Metz
*Attorney, Agent, or Firm*—Gilbert E. Alberding

[57] ABSTRACT

An article of manufacture and a method are disclosed herein for improving lubricity and wear resistance of a given substrate by applying thereto a composition consisting essentially of low-molecular weight tetrafluoroethylene telomers, an antistatic agent, preferably in the form of a tertiary amine, and a volatile organic solvent, and removing the volatile solvent to produce a thin, dry coating upon said substrate. The compositions herein disclosed have been found to be most effective as preservatives for coating gramophone or phonograph records which provide marked reduction of record groove wear while substantially minimizing noise and harmonic distortion.

21 Claims, No Drawings

PROTECTIVE LUBRICATING COMPOSITIONS FOR RECORDINGS

BACKGROUND OF THE INVENTION

1. Field of the Invention

The present invention pertains generally to lubrication of specified substrates and, more particularly, to an improved lubrication composition and method of its application. The improved, wear-resistant, low friction substrates have a coating provided by such composition, said substrates including sound and video recordings such as gramophone or phonographic records, video discs and the like.

2. Description of the Prior Art

Lubrication of various substrates, and particularly of substrates upon which recorded signals have been stored and from which said signals can be recalled by dynamic means, has not been generally recognized and where attempts have been made to lubricate such substrates they have not proven fully satisfactory. In particular, substrates possessing this special problem include synthetic, natural and combinations of thermoplastic materials and include resins, shellac, polyvinyl acetate, polyvinyl chloride, cellulose acetate, cellulose nitrate and their derivatives as well as numerous other compositions that are generally formed through various press moulding means into photographic records or discs as well as similar thermoplastic structures having trackable groove contours and reproducing recorded monaural and stereophonic and video signals therefrom.

As is generally known, a phonograph cartridge serves to convert the variations on the walls of the grooves of a phonograph record into electrical signals whereby the variations or wavy pattern on the grooves determine the frequency and the amplitude of the sound vibrations. The cartridge includes a stylus or pickup needle usually in the form of a diamond of sapphire which generally has a hemispherical or ellipsoidal tip which rides or dips into the record groove and moves in response to variations of the pattern of said groove. The stylus, in turn, is generally attached to an armature which moves with the stylus to induce variations in an electrical or magnetic field in response to the stylus movement. This generates an electrical signal representative of the groove configuration which may then be amplified and used to drive speakers. Again, the stylus is caused to mechanically vibrate in response to the variations in amplitude and frequency of the undulations of the record groove wall which comprise the recorded signal.

A stylus has to track a plurality of evenly spaced groove contours with recorded signals on the order of between 15–20 and 20,000 Hz. Moreover, with the introduction of discrete four-channel record systems or quadrasonic systems, a stylus must faithfully track grooves with recorded signals to cause vibrations of up to 50,000 Hz. As the stylus rides in the record groove, the relatively hard stylus wears away the relatively soft thermoplastic material of the record forming the groove. There has been heretofore no easy solution to alleviate the problem of record wear caused by the stylus riding in the groove contour of such recordings.

The deterioration of the sound quality of records with increase in the number of plays through wear of their tracks by repeated uses results in records becoming unusable and often being discarded within a short period of time. A number of factors are responsible for wear including the general wear through abrasive and adhesive wear mechanisms to an extent proportional to stylus loading. This loading is not only the deadweight stylus load on the record which may range from about 1 gram to 4 grams but also includes dynamic inertial forces caused by stylus mass and the frequency of stylus directional changes as it tracks the groove undulations. As known, reduction of deadweight load and stylus mass lowers the rate of groove wear but wear and the consequent loss of playback fidelity cannot be entirely eliminated. At any rate, most attempts of the prior art via record cleaners or alleged lubricates have simply resulted in cleaning only or depositing chemical films onto records without being successful in that such materials generally reduce the record fidelity due to rapid groove wear if cleaned or to hydrodynamic damping of the stylus tracking if oily substances are deposited. Further, it is often observed in the use of these materials that the noise level is increased due mainly to dust captured along with the formation of a tacky deposit upon the stylus. Moreover, it has been observed that attempts to use powdered solid lubricants such as graphite, molybdenum disulfide and the like have several disadvantages for they do not only reduce fidelity but also increase noise due to particulate interference in the record grooves.

In general, various silicones and hydrocarbon waxes and certain fluorinated telomeric compositions have been used as lubricants in sundry applications. U.S. Pat. Nos. 3,067,262 and 3,345,424 discuss the manufacture of such fluorinated telomers. U.S. Pat. No. 3,067,262 discloses tetrafluoroethylene telomerized with trichlorotrifluoroethane whereby moderately high molecular weight products are produced. The patent discloses further that in order to obtain a wax-like product, a second active telogen must be included in the telomerization process. In general, such active telogens are hydrogen-containing compounds including tertiary hydrocarbons, aliphatic alcohols, divalent sulfur compounds, aliphatic tertiary amines, aliphatic ethers, carbonyl compounds and dialkyl phosphites. Since these active telogens contain hydrogen, the telomer products contain significant amounts of hydrogen, e.g., from 0.05 to 2% by weight.

U.S Pat. No. 3,345,424 discloses an improvement over the telomeric compositions of U.S. Pat. No. 3,067,262 in that the improved compositions have no hydrogen and are of a lower melting point. In effect, the improved compositions are derived from the products obtained by telomerization of tetrafluoroethylene with certain haloalkanes. In fact, the compositions are made by the chlorination or fluorination of certain fractions of telomer iodide mixtures whereby the iodine is replaced by chlorine or fluorine. The utility of these compositions is found in their application as a general dry lubricant, protective surface treatment, oil and water repellents, and a mold release and antistick composition.

In U.S. Pat. No. 3,652,314 to Castner, a method is disclosed for renewing, resurfacing and preserving a phonograph record by the steps of coating the record with a composition consisting essentially of acrylic polymer, polyethylene emulsion, a detergent, an ether and water, brushing the composition into the grooves, removing any excess, drying and playing the phonograph record.

In U.S. Pat. Nos. 3,862,860 and 3,954,637, a method and composition are disclosed for improving lubricity, abrasion resistance, and lowering the coefficient friction of substrates such as photographic films, magnetic surfaces and other recording elements by applying to such substrates a solution comprising tetrafluoroethylene telomer and a copolymer of vinyl chloride and trifluorochloroethylene in a volatile solvent, drying and removing the excess, and substrates so lubricated. In effect it was shown that the combination of a lubricant, viz., tetrafluoroethylene telomer and non-lubricant, viz., poly(trifluorochloroethylene-co-vinyl chloride) provides a coefficient of friction below that of the lubricant per se.

SUMMARY OF THE INVENTION

The present invention, which provides a wear-resistant lubricous coating for phonograph records and the like is a solution consisting essentially of low-molecular weight fluorocarbon telomers, an antistatic agent, and a volatile solvent therefor. Generally, the telomers have a maximum average molecular weight of about 3700. The composition can be easily applied to any number of thermoplastic substrates generally used in the record or gramophone trade, upon which are recorded signals in the form of undulations or grooves, to provide a glossy coating that promotes a marked increase in lubrication properties thereof.

Accordingly, an object of the present invention is to provide a method which produces a phonograph record element having low friction characteristics.

An object of this invention is to provide a method and phonograph record article or similar plastic substrate having a greater extension of its playing life without any initial significant loss of frequency response or amplitude fidelity.

Another object of the present invention is to provide a composition and method which impart wear resistance to phonograph elements through a protective coating capable of bearing a momentary high load without any significant reduction in playing functionalities throughout a substantial number of plays.

Yet another object of the present invention is to provide a composition and method which produce a coating film on phonographic recording elements and the like which enhance the surface qualities of such elements, such as static discharge and appearance.

Still another object of the present invention is to provide a method by which the composition of the instant invention may be conveniently applied.

Another object of this invention is to produce a treated phonograph record or disc which after a large number of plays does not result in any substantial particle build-up on the stylus.

Still another object of the present invention is to provide a coated record surface having long life, great wear resistance and low surface friction.

Yet still another object of the present invention is to provide a phonograph record having both high lubricity and resistance to increase in noise and harmonic distortion through normal playings.

A further object of the present invention is to provide an improved, thin lubrication system for groove-tracking record elements having recorded audio and/or video signals stored thereon and which can be subjected to dynamic tracking means to render the signals recorded thereon.

These and other objects of the present invention will become apparent from the following description and discussion.

DETAILED DESCRIPTION OF THE INVENTION

According to the present invention, a composition is formed and is capable of imparting to various substrates, including a phonograph record, a low coefficient of friction, said composition consisting essentially of low-molecular weight telomers of fluorocarbons, and especially telomers of tetrafluoroethylene, an antistatic agent, and a solvent therefor. The telomers of the preferred embodiment to be hereinafter described are soluble in the organic solvent and for the most part do not exist in the composition herein contemplated as particles or as colloidal suspensions. In effect, the composition of the present invention is generally an essentially homogeneous solution, that is, it exhibits a uniform composition throughout its entire volume.

As used herein the term "telomers" include homotelomers and cotelomers and the term "telomerization" includes homotelomerization, cotelomerization, and the term "low molecular weight telomers" means telomers having a maximum average molecular weight of about 3700.

The term "substrate" as used herein embraces various surfaces of articles to be treated by the compositions and refer to plastic substrates, metal substrates, combination of plastic and metallic substrates, and in particular to playing elements of synthetic, natural and combinations of thermoplastic materials and include resins, shellac, polyvinyl esters such as polyvinyl acetate, polyvinyl benzene, polyvinyl chloride, cellulose acetate, cellulose butyrate, cellulose nitrate, their derivatives as well as copolymers and blends thereof. In particular, the term "substrates" include those surfaces which are made of numerous compositions that are generally formed through various press molding means into phonographic records or discs as well as similar thermoplastic structures having trackable groove contours thereon which when used in conjunction with certain dynamic means such as styli are capable of following said contours and reproducing recorded monaural and stereophonic and video signals therefrom.

One group of preferred telomers of this invention may be represented by the general structural formula:

$$R-(CF_2CF_2)_a X \qquad (I)$$

wherein R is a haloalkyl containing one to four carbon atoms, X is a member selected from the group consisting of chlorine, iodine, and fluorine and $a$ is an integer from about 6 to about 16. A preferred composition of the present invention is one where X is chlorine or fluorine and the radical R is a group having the structural formula:

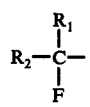

wherein $R_1$ and $R_2$ each independently represent perfluoroalkyl and monochloroperfluoroalkyl wherein each alkyl moiety has one to four carbon atoms. This tetrafluoroethylene telomer has been available commercially under the trade name MP-51. In general, these telomers are completely halogenated telomers, in that they do not contain hydrogen, and have a molecular weight range of about 800 to about 1800. A fuller description of these particular telomer compositions is given in U.S. Pat. No. 3,345,424.

Other groups of related and preferred telomers are those that have the formula:

$$R'(CF_2-CF_2)_b Y \qquad (II)$$

wherein R' is a hydrogen-containing moiety of a telogen, said telogen being a member selected from the group consisting of tertiary hydrocarbons, aliphatic alcohols, divalent sulfur compounds, aliphatic tertiary amines, aliphatic ethers, aliphatic carbonyl compounds, dialkylamides, and dialkyl phosphites, and Y is chlorine or a chlorofluoroalkyl wherein the alkyl portion has one to two carbon atoms and where $b$ is an integer from about 3 to about 50. In general, these tetrafluoroethylene telomers, as distinguished from the telomers mentioned above, contain hydrogen, e.g., from 0.05 to 2% by weight.

Hydrogen-containing tetrafluoroethylene telomers are available under the trademark Vydax AR. These telomers have a maximum average molecular weight of about 3700, a specific gravity of about 2.16, a melting point of 300° C., and are generally furnished at various concentrations including a 20% solid suspension in trichlorotrifluoroethane. These particular telomer compositions are generally described in U.S. Pat. Nos. 2,540,088 and 3,067,262.

It has been found possible to separate from Vydax AR a somewhat lower molecular weight fraction by the conventional expedients of extracting, decanting, filtering, or centrifuging. By such methods, a selected fraction is obtained where, in the above-mentioned structural formula II, $b$ has a value of about 3 to about 8. In general, lack of turbidity or presence of clarity of the solution is found to be a good indication of such a selected fraction. The average molecular weight of this lower fraction is between about 400 and 900, the fraction being readily soluble in the herein described organic solvents. The melting point of this fraction is generally less than 120° C.

For the hydrogen-containing telomers, such as Vydax AR, it has been found, for certain preferred embodiments that the use of the lower molecular weight fraction, that is, the fraction having a molecular weight below about 900, results in favorable properties for certain end uses herein disclosed. Thus, during stylus tracking on a stereo or quadraphonic record coated with a composition of the present invention, there is observed no substantial wear particle build-up on the stylus as compared to an untreated record. Further, there is no actual clogging or interference of the groove undulations even in a single alternation with a record at frequencies up to and including 45,000 Hz., which may occupy no more than about 0.0008 linear inches of space along the record groove.

In general, the concentration of the above-mentioned telomers can vary over a relatively broad range, but a range of about 2.0 weight percent to about 0.001 weight percent of the total weight of the composition has been found most effective. In practice, a concentration of between about 0.15 to about 0.005 weight percent has been found to be satisfactory for treating phonograph records.

The use of an antistatic agent renders the solutions herein effective from a practical standpoint in that such compositions eliminate or substantially reduce the electrostatic charge on phonograph record surfaces to which said compositions are applied, thereby reducing the attractive forces which induce the migration of dust and other undesirable foreign particles to the record surface. The electrostatic charge can result from several causes, but is especially noticeable upon removing a record from its protective jacket, wiping its surface with cloth or brush, and otherwise contacting or buffing the record surface. Representative of one group of preferred antistatic agents found highly effective in the compositions herein are the tertiary amines, including the dialkanolamines. These amines have been found to be compatible in terms of solubility with the solvents herein disclosed.

The particular dialkanolamines found highly suitable for the herein described composition may be represented by the general structural formula:

$$HOCH_2CH_2NCH_2CH_2OH$$
$$|$$
$$R''$$

wherein R'' is an alkyl having about four to about twenty carbon atoms. These dialkanolamines have a molecular weight of about 150 to about 400. Illustrative of such dialkanolamines are N,N-bis(2-hydroxyethyl)-dodecylamine, N,N-bis(2-hydroxyethyl)tetradecylamine and N,N-bis(2-hydroxyethyl)tetradecylamine. The dialkanolamines may be readily made by conventional chemical techniques known in the art. A process for preparing various N-alkyl substituted N,N-dialkanolamines is desclosed in U.S. Pat. No. 2,541,088.

Other suitable and preferred antistatic agents may be readily incorporated into the compositions herein. Such agents should be soluble in the solvent employed. Thus other antistatic agents include fatty quaternary ammonium compounds, fatty esters, phosphate esters and polyethylene glycols. The concentration of the antistatic agent can vary over a wide range so long as it is effective in reducing or removing electrostatic charge. In general, a concentration of about 1.0 to about 0.001 weight percent based on the total composition has been found to be most effective.

The solvents utilized with the compositions of the present invention are essentially organic and are generally halogenated. While certain solvents are useful, provided there is no adverse effect upon the substrate, trichlorotrifluoroethane is particularly desirable as having suitable organic dissolution powers, high volatility, and essentially no physical or chemical effect on the substrate. The trichlorotrifluoroethane can be either isomer, i.e., it may be 1,1,1-trichloro-2,2,2-trifluoroethane or 1,1,2-trichloro-1,2,2-trifluoroethane. Certain other solvents can also be incorporated with trichlorotrifluoroethane to the extent that the combination has no more adverse effect on the substrate than does trichlorotrifluoroethane alone. Such other solvents include, for example, 1,1,1-trichloroethane, benzotrifluoride, perfluorodimethylcyclobutane, chloroform, tetrachloroethylene, trichloroethylene, methylene chloride, carbon tetrachloride, dichloroethylene, dichloroethane, and mixtures thereof.

A preferred composition of the present invention consists of low-molecular weight fluorocarbon telomers having a maximum average molecular weight of about 3700, an organic solvent and an antistatic agent which is, preferably, a tertiary amine as defined above.

Lubrication of susbstrates herein contemplated can be accomplished by applying the herein-described composition wherein the low-molecular weight telomers are generally present in an amount less than two weight percent to a given substrate, evaporating the solvent therefrom and lightly buffing, if desired, the thus-coated substrate to provide a clear coating. Application of the composition can be accomplished by numerous means including spraying, dipping, brushing, swabbing, flowing and doctoring. For most purposes, spraying and swabbing are preferred because of the complete and uniform coverage these methods afford.

There can be added to the composition of the present invention minor amounts of various conventional components including antioxidants, pigments, hardeners, fillers, binders, odorants, dyes and the like if there is need to do so and to the extent that such ingredients are soluble or dispersible in the solvent and do not degrade the performance characteristic of the present compositions.

A more detailed appreciation of the invention will be gained with reference to the following examples. It is to be understood that the following examples are for the purpose of illustration and the invention is not to be regarded as limited to any one of the specific compositions or processes recited therein.

EXAMPLE I

A lubricating composition was prepared by adding 594 grams trichlorotrifluoroethane (Freon TF) to 6 grams Vydax AR, a 20 weight percent dispersion of tetrafluoroethylene telomers in 80 weight percent trichlorotrifluoroethane so as to provide about a 0.2 weight percent concentration of said telomers in the final concentration. Generally, the average particle size of the telomers in said dispersion is about five microns. The resulting mixture was thoroughly agitated and allowed to settle for about 168 hours. The upper clear solution was then removed from the relatively fluffy, white sediment to yield about 570 grams of clear solution. About 0.53 ml of Anti-Stat 273C, a commercial N,N-bis(2-hydroxyethyl)alkylamine was added for each liter of clear solution to provide in a concentration of approximately 0.03 weight percent. The alkyl percent. The alkyl moiety of said alkylamine ranges from about dodecyl to tetradecyl. This resulting clear composition was applied to a National Association of Broadcasters (NAB) No. 12-5-98 phonograph test record by gently spraying over the surface thereof whereby evaporation removes the solvent at room temperature and results in an almost instantaneous deposition upon the record surface of a practically invisible coating thereon. The thus-treated record was thereafter carefully buffed by rubbing in the direction of the grooves employing a velvet buffing pad so as to provide a bright, lustrous finish thereon.

In order to determine both reduction of distortion and background noise of treated as compared with untreated records, tests were conducted and were determined by using a Hewlett-Packard Wave Analyzer (Model No. 3590A with a 3594A attachment). The studies which were made over the frequency range of about 500 Hz. to about 13 KHz. employed a "window" bandwidth of about 100 Hz. The sweep rate was set at 100 Hz., per second, the meter damping being set at a "medium" setting. The maximum input voltage was set at 0.1, reference adjustment to relative and the meter to Linear DB, with a frequency range of 62 KHz. After 50 plays, noise in the 3 KHz. band had increased by an average of 1.4 dB compared with an average increase of 3.7 dB for an untreated record subjected to the same test, and the second harmonic had changed by an average of 2 dB compared with an average change of 8 dB for an untreated record. Thus, the composition of the present invention when applied to the record surface demonstrates that there is a significantly lower increase in the background noise and a significantly smaller change in harmonics as compared with an untreated record surface when both records are subjected to the same number of playings.

EXAMPLE II

A lubricating composition according to the instant invention was prepared by adding 598.8 grams of trichlorotrifluoroethane solvent (Freon TF) to 1.2 grams of MP-51, a tetrafluoroethylene telomer, so as to provide a 0.2 weight percent concentration of telomers in the final composition. The resulting mixture was carefully stirred for about 30 minutes and only a few insoluble particles remained which were then removed by filtering through filter paper No. 3. To the resulting clear solution there was added Anti-Stat 273C, described in Example I in an amount equivalent to 0.53 ml per liter of solution, so as to provide a concentration of about 0.03 weight percent thereof in the final composition. This composition was sprayed upon a phonograph record surface and carefully buffed after evaporation of solvent.

The phonograph record test equipment described in Example I was again employed. The mean noise level on the treated record was measured at 59.3 dB below reference level compared with 60 dB below reference for an untreated record; and the second harmonic of the 3 KHz. fundamental test frequency for the treated record was measured at a mean peak height of 29 dB below reference level compared with 30.3 dB below reference for the untreated record. Thus, it was demonstrated that there is no significant increase in background noise or change in harmonics due to the application of the lubricating composition of the present invention to a new record.

EXAMPLE III

Using a paper clip friction test method as recited in "Processed Film Lubrication: Measurement by Paper Clip Friction Test and Improvement of Projection Life" by T. Anvelt, J. F. Carroll, and L. J. Snyder, "Journal of the Society of Motion Picture and Television Engineers," Vol. 80, pp. 734 to 739 (1971), it was found that the standard NAB vinyl phonograph test records which were treated by the method disclosed in Example I exhibit coefficients of friction which were significantly lower than the coefficient of friction for a record merely cleaned with the solvent, trichlorotrifluoroethane. This is shown in the following tabulation:

| Phonograph Record Specimen Identification | Composition of Record Treating Solution: Trichlorotrifluoroethane plus the following (Wt. %) | Paper Clip Friction Test, Coefficient of Friction |
|---|---|---|
| A | 1.0% tetrafluoroethylene telomer concentrate (20% solids), Vydax AR, (decanted) plus 0.024% N,N-bis(2-hydroxyethyl)alkylamine; (alkyl = $C_{12}$-$C_{14}$), Anti-Stat 273C | 0.13 |
| B | 0.2% tetrafluoroethylene telomer, MP-51, plus 0.03% N,N-bis(2-hydroxyethyl)alkylamine, (alkyl = $C_{12}$-$C_{14}$), | |

-continued

| Phonograph Record Specimen Identification | Composition of Record Treating Solution: Trichlorotrifluoroethane plus the following (Wt. %) | Paper Clip Friction Test, Coefficient of Friction |
|---|---|---|
| | Anti-Stat 273C | 0.15 |
| C | None | 0.22 |

EXAMPLE IV

Accelerated phonograph record wear tests were conducted on NAB test records which had been treated with the composition of the subject invention. The results achieved from the treated records were compared with the results of the wear test conducted on a cleaned test record which had not been treated in accordance with the present invention. The test utilized a standard type automatic record turntable rotating at 33⅓ rpm with the stylus on the tone arm adjusted to 9.5 grams load on the record surface. This high stylus load was used in order to accelerate the wear process and thereby provide better discrimination among record treatments. Various compositions of the present invention were applied to the record surfaces in accordance with the procedures described in Example I.

The untreated test record was cleaned by gently washing the surface with a disposable wiper soaked with mild dish detergent, then rising with lukewarm tap water, and drying with an absorbent disposable towel. Test results after 125 to 128 playing cycles are presented in the tabulation below:

| Phonograph Test Record Identification | Composition of Record Treating Solution: Trichlorotrifluoroethane plus the following (wt. %) | Record Surface Appearance at Test Termination and Relative Rating (0 = clean, 100 = heavily covered with wear debris) |
|---|---|---|
| D | 1.0% tetrafluoroethylene telomer concentrate (20% solids), Vydax AR, (decanted), plus 0.024% N,N-bis(2-hydroxyethyl)alkylamine, (alkyl = $C_{12}$-$C_{14}$), Anti-Stat 273C | Randomly scattered wear particles. Rating = 4 |
| E | 0.2% tetrafluoroethylene telomer, MP-51, plus 0.03% N,N-bis(2-hydroxyethyl)alkylamine, (alkyl = $C_{12}$-$C_{14}$), Anti-Stat 273C | Scattered wear particles. Rating = 6 |
| F | Record cleaned with mild detergent | Heavily covered with various sized particles of wear debris. Rating = 100 |

Comparison of the above test results reveals that the two records treated with the compositions of the present invention were worn to only a small fraction of the extent of wear experienced on the cleaned-only record, as judged by visual observations of the accumulation of wear particles on the test record surfaces.

EXAMPLE V

A solution was prepared by combining 99.0 weight percent trichlorotrifluoroethane (Freon TF) with 0.1 weight percent tetrafluoroethylene telomer concentrate (20% solids), Vydax AR, allowing the solution to settle and thereafter decanting. To 99.98 weight percent of the clear, decanted solution, which contained about 0.03 weight percent of said telomer, was added 0.02 weight percent N,N-bis(2-hydroxyethyl)alkylamine, (alkyl = $C_{12}$-$C_{14}$), Anti-Stat 273C. A clear solution resulted and was sprayed onto a test phonograph record (NAB 12-5-98), the trichlorotrifluoroethane was allowed to evaporate, and the playing surface was lightly buffed to leave a thin coating. The record was then subjected to playing and compared with an untreated record to determine changes in any surface noise. For this purpose, the signal from the stylus, tracking at one gram load in the record grooves, was fed to a Tektronix 5100 Series Storage Oscilloscope for display. During the first number of playings, the coated record showed significantly less surface noise than did an identical uncoated record; and progressively throughout some 120 playings, the level of surface noise of the coated record ultimately reached the background or noise level that the uncoated record showed on its first playings.

The above examples show that compositions of the subject invention markedly reduce phonograph record wear, lower the coefficient of friction, and preserve the original recorded fidelity; and the compositions significantly reduce or at least do not cause background or surface noise when applied to a record and effectively retard the rate of noise increase over a large number of actual playings.

Although the several specific embodiments of the present invention have been illustrated, it is apparent that those skilled in the art will recognize numerous changes and modifications within the scope of the invention without departing therefrom.

I claim:

1. A composition for imparting wear resistance and lubricity to a substrate upon which recorded signals have been stored and from which said signals can be recalled by dynamic means, said composition consisting essentially of an essentially homogeneous halogenated organic solution of a major proportion of an inert halogenated solvent, a low-molecular weight tetrafluoroethylene telomer, said telomer being a member selected from the group consisting of:

$$R(CF_2-CF_2)_a X$$

wherein R is a haloalkyl containing 1 to 4 carbon atoms, X is a member selected from the group consisting of chlorine, iodine and fluorine and $a$ is an integer from about 6 to about 16, and $$R'(CF_2-CF_2)_b Y$$

wherein R' is a hydrogen-containing moiety of a telogen, said telogen being a tertiary hydrocarbon, Y is a member selected from the group consisting of chlorine and chlorofluoroalkyl, and $b$ is an integer from about 3 to about 8, said telomer being present in an amount of about 0.001 to 2.0 weight percent based on the total weight of said composition, and an antistatic agent selected from the group consisting of tertiary amines, fatty quaternary ammonium compounds, fatty esters, phosphate esters and polyethylene glycols, said antistatic agent being present in an amount effective to substantially reduce or remove electrostatic charge.

2. A composition for imparting wear resistance and lubricity to a substrate upon which recorded signals have been stored and from which said signals can be recalled by dynamic means, said composition consisting essentially of an essentially homogeneous halogenated organic solution of a major proportion of an inert halogenated solvent, a low-molecular weight tetrafluoroethylene telomer, said telomer being a member selected from the group consisting of:

$$R(CF_2-CF_2)_a X$$

wherein R is a haloalkyl containing 1 to 4 carbon atoms, X is a member selected from the group consisting of chlorine, iodine and fluorine and $a$ is an integer from about 6 to about 16, and $$R'(CF_2-CF_2)_b Y$$

wherein R' is a hydrogen-containing moiety of a telogen, said telogen being a tertiary hydrocarbon, Y is a member selected from the group consisting of chlorine and chlorofluoroalkyl, and $b$ is an integer from about 3 to about 8, said telomer being present in an amount of about 0.001 to about 2.0 weight percent based on the total weight of said composition, and as an antistatic agent, a tertiary amine of the formula:

$$HOCH_2-CH_2-\underset{R''}{N}CH_2-CH_2-OH$$

wherein R'' is an alkyl group having from about 4 to 20 carbon atoms present in an amount effective to substantially reduce or remove electrostatic charge.

3. The composition of claim 2 wherein said antistatic agent is present in an amount of about 0.001 to about 1.0 weight percent based on the total weight of the composition.

4. The composition of claim 2 wherein said tertiary amine has a molecular weight between about 150 and about 400.

5. The composition of claim 2 wherein said tertiary amine is N,N-bis(2-hydroxyethyl)dodecylamine.

6. The composition of claim 2 wherein said tertiary amine is N,N-bis(2-hydroxyethyl)tridecylamine.

7. The composition of claim 2 wherein said tertiary amine is N,N-bis(2-hydroxyethyl)tetradecylamine.

8. The composition of claim 2 wherein the tetrafluoroethylene telomer having the structural formula:

$$R'(CF_2-CF_2)_b Y$$

has $b$ as an integer from about 3 to about 6.

9. The composition of claim 2 wherein said tetrafluoroethylene telomer is present in an amount of about 0.005 to about 0.15 based on the total weight of said composition.

10. A composition for imparting wear resistance and lubricity to a substrate upon which recorded signals have been stored and from which said signals can be recalled by dynamic means, said composition consisting of an essentially homogeneous halogenated organic solution of a major proportion of an inert halogenated solvent, a low-molecular weight tetrafluoroethylene telomer, said telomer being a member selected from the group consisting of:

$$R(CF_2-CF_2)_a X$$

wherein R is a haloalkyl containing 1 to 4 carbon atoms, X is a member selected from the group consisting of chlorine, iodine and fluorine and $a$ is an integer from about 6 to about 16, and $$R'(CF_2-CF_2)_b Y$$

wherein R' is a hydrogen containing moiety of a telogen, said telogen being a tertiary hydrocarbon, Y is a member selected from the group consisting of chlorine and chlorofluoroalkyl, and $b$ is an integer from 3 to about 8, said telomer being present in an amount of about 0.001 to about 2.0 weight percent based on the total weight of said composition and as an antistatic agent, a tertiary amine of the formula:

$$HOCH_2-CH_2-\underset{R''}{N}CH_2-CH_2-OH$$

wherein R'' is an alkyl group having from about 4 to 20 carbon atoms present in an amount effective to substantially reduce or remove electrostatic charge.

11. The composition of claim 10 wherein said antistatic agent is present in an amount of about 0.001 to about 1.0 weight percent based on the total weight of the composition.

12. The composition of claim 10 wherein said tertiary amine has a molecular weight between about 150 and about 400.

13. The composition of claim 10 wherein said tertiary amine is N,N-bis(2-hydroxyethyl)dodecylamine.

14. The composition of claim 10 wherein said tertiary amine is N,N-bis(2-hydroxyethyl)tridecylamine.

15. The composition of claim 10 wherein said tertiary amine is N,N-bis(2-hydroxyethyl)tetradecylamine.

16. The composition of claim 10 wherein the tetrafluoroethylene telomer having the structural formula:

$$R'(CF_2-CF_2)_b Y$$

has $b$ as an integer from about 3 to about 6.

17. The composition of claim 10 wherein said tetrafluoroethylene telomer is present in an amount of about 0.005 to about 0.15 based on the total weight of said composition.

18. A composition of matter capable of imparting wear resistance and lubricity to the playing surface of a phonograph record consisting essentially of an essentially homogeneous halogenated organic solution of a major proportion of an inert halogenated solvent, tetrafluoroethylene telomers having maximum average molecular weight of about 1800 or less, said inert halogenated solvent being a member selected from the group consisting of trichlorotrifluorethane, trichlorethane, benzotrifluoride, perfluorodimethylcyclobutane, chloroform, tetrachloroethylene, trichloroethylene, methylene chloride, carbon tetrachloride, dichloroethylene and dichloroethane, and an antistatic agent selected from the group consisting of tertiary amines, fatty quaternary ammonium compounds, fatty esters, phosphate esters and polyethylene glycols, said agent being present in an amount effective to substantially reduce or remove electrostatic charge.

19. A composition of matter capable of imparting wear resistance and lubricity to the playing surface of a phonograph record consisting of an essentially homogeneous halogenated organic solution of a major proportion of an inert halogenated solvent tetrafluoroethylene telomers having a maximum average molecular weight of about 1800 or less, said inert halogenated solvent being a member selected from the group consisting of trichlorotrifluoroethane, trichloroethane, benzotrifluoride, perfluorodimethylcyclobutane, chloroform, tetrachloroethylene, trichloroethylene, methylene chloride, carbon tetrachloride, dichloroethylene and dichloroethane, and an antistatic agent selected from the group consisting of tertiary amines, fatty quaternary ammonium compounds, fatty esters, phosphate esters and polyethylene glycols, said agent being present in an amount effective to substantially reduce or remove electrostatic charge.

20. A composition of matter capable of imparting wear resistance and lubricity to the playing surface of a phonograph record consisting essentially of an essentially homogeneous, halogenated organic solution of a major proportion of an inert halogenated solvent tetrafluoroethylene telomers having maximum average molecular weight of about 1800 or less, the concentration of said telomers being about 0.001 to about 2.0 weight percent based on the total weight of the solution, said inert halogenated solvent being a member selected from the group consisting of trichlorotrifluoroethane, trichloroethane, benzotrifluoroide, perfluorodimethylcyclobutane, chloroform, tetrachloroethylene, trichlorethylene, methylene chloride, carbon tetrachloride, dichloroethylene and dichloroethane, and an antistatic agent selected from the group consisting of tertiary amines, fatty quaternary ammonium compounds, fatty esters, phosphate esters and polyethylene glycols, said agent being present in an amount from about 0.001 to about 1.0 weight percent based on the total weight of the solution.

21. A composition of matter capable of imparting wear resistance and lubricity to the playing surface of a phonograph record consisting of an essentially homogeneous, halogenated organic solution of a major proportion of an inert halogenated solvent tetrafluoroethylene telomers having maximum average molecular weight of about 1800 or less, the concentration of said telomers being about 0.001 to about 2.0 weight percent based on the total weight of the solution, said inert halogenated solvent being a member selected from the group consisting of trichlorotrifluoroethane, trichloroethane, benzotrifluoride, perfluorodimethylcyclobutane, chloroform, tetrachloroethylene, trichlorethylene, methylene chloride, carbon tetrachloride, dichlorethylene and dichloroethane, and an antistatic agent selected from the group consisting of tertiary amines, fatty quaternary ammonium compounds, fatty esters, phosphate esters and polyethylene glycols, said agent being present in an amount from about 0.001 to about 1.0 weight percent based on the total weight of the solution.

* * * * *